United States Patent [19]
Ohtani

[11] Patent Number: 4,782,400
[45] Date of Patent: Nov. 1, 1988

[54] SYSTEM FOR ENCODING OR DECODING ANALOG VIDEO SIGNALS

[75] Inventor: Nobuhiro Ohtani, Tokyo, Japan

[73] Assignee: NEC Corporation, Japan

[21] Appl. No.: 77,408

[22] Filed: Jul. 24, 1987

[30] Foreign Application Priority Data

Jul. 25, 1986 [JP] Japan .................................. 61-176029

[51] Int. Cl.$^4$ .............................................. H04N 1/40
[52] U.S. Cl. .................................. 358/283; 358/260; 358/280
[58] Field of Search ............... 358/260, 261, 280, 282, 358/283

[56] References Cited

U.S. PATENT DOCUMENTS 4,651,293  3/1987  Kato ...................................... 358/283

Primary Examiner—Howard W. Britton
Attorney, Agent, or Firm—Laff, Whitesel, Conte & Saret

[57] ABSTRACT

A coder/decoder system develops signals for printing half tone images. The invention uses a selected one of many dither matrices to provide a selected resolution of half tone images. Each dither matrix has n-by-n capacity. The coder and decoder includes a cascaded number of register and EX-OR gate combinations corresponding to the largest dither matrix. A number of steering gates block off parts of the cascade corresponding to the size of the dither matrix that is actually selected for the transmission of any given image.

11 Claims, 5 Drawing Sheets

SYSTEM FOR ENCODING OR DECODING ANALOG VIDEO SIGNALS

BACKGROUND OF THE INVENTION

The present invention relates to an encoder and a decoder for use in a digital transmission of video signals, and more particularly to an encoder and a decoder for respectively encoding and decoding video signals including halftones.

Video signals obtained by scanning a pictorial advertisement, a photograph or the like with a scanner usually are analog signals having halftones. One of the prior art methods of converting such an analog video signals into binary signals and to compression-encode them is to express pseudo-halftone signals by an ordered dither method. This method generates a bit sequence of "1" and "0" and run-length encode the consecutive black and white lengths of this signal sequence.

The ordered dither method uses an n-by-n dither matrix storing thresholds for conversion into a bit sequence consisting of "1" and "0" codes. The thresholds periodically vary in the directions of the main scan and the subscan. Thus, an analog video signal sequence representing gray is converted into a bit sequence of periodic black and white pixels. Accordingly, the run-length is short and the number of runs is great Therefore, the compression efficiency of the run-length encoding is extremely low. Meanwhile, the U.S. Pat. No. 4,475,127 reveals a logic converter circuit for a run-length encoding, at a high compression efficiency, of signal sequences which are obtained by the ordered dither method.

This logic converter circuit converts a signal sequence consisting of "1" and "0" codes, in which white and black pixels periodically alternate, into a new signal sequence in which the run lengths of "1" and "0" are greater. The converter includes a circuit for generating a signal indicating whether the sum of n signals is an odd or an even number. These n signals comprise an input signal and signals produced by delaying that input signal by 1, 2, 3 ..., (n−1) sampling periods.

However, the aforementioned logic converter circuit disclosed in the U.S. Pat. No. 4,475,127 utilizes the periodicity inherent in the bit sequence. No common logic converter circuit can be used for a bit sequence digitized with threshold values which vary in different periods, i.e. a bit sequence/digitized with dither matrices of different sizes. Therefore, the logic inverter has to be redesigned for a different dither matrix size.

SUMMARY OF THE INVENTION

An object of the present invention it to provide an encoder and a decoder which require no redesigning of the logic converter circuit even if there is a change in the size of the dither matrix used in the digitization of analog video signals.

According to the invention, an encoder is provided for encoding a video signal which is gradually variable between a high and a low level. The encoded signal is a data-compression digitized signal, comprising a first means for generating a plurality of threshold signals which, in a preselected period, successively take the values of a first predetermined number of halftone threshold levels. The halftone threshold levels are predetermined between the high and the low levels. A second means compares the video signal with the threshold signal to produce a first sequence of bit, each bit being representative of a predetermined one or the other of binary numbers "0" and "1", when the video signal has a level which is higher and lower than each of the threshold levels, respectively. A third means produces a second sequence of bit which are representative of codes "1" and "0" depending upon whether the sum of a current bit of the first sequence and i (i being a positive integer) bits taken for previous i sampling periods is an odd or even. The third means comprises i sets of a register for delaying one bit and an EX-OR gate for providing an addition of a bit and a bit delayed by one sampling period. The sets being connected so that the output of the EX-OR gate is coupled to an input of another EX-OR gate in the next set and the output of the register is coupled to the input of another register in the next set. The third means further comprises gate means arranged between the registers for enabling and disenabling a coupling between the register and the other register. A gate control means provides a control signal to the gate means depending upon the number of bits to be added. Fourth means further converts the second sequence of bits into data-compression digitized signals.

Further, according to the invention, a decoder is used in combination with the aforementioned encoder, for decoding the digitized signals to a third sequence of bits which are representative of a reproduction of the first sequence of bits. The decoder has fifth means for decoding the digitized signals into a fourth sequence of bits which are representative of a reproduction of the second sequence of bits, by data expansion. Sixth means produces the third sequence of bits which are representative of codes "1" and "0" depending upon whether the sum of a current bit of the fourth sequence and i (i being a positive integer) bits taken from previous i sampling periods is an odd or even. The sixth means comprises i sets of a register for delaying one bit and an EX-OR gate having one input which is coupled to the output of the register. The sets are cascade-connected to each other so that the output of the EX-OR gate is coupled to an input of another EX-OR gate in the next set. The input of the register is coupled to the output of another register in the next set. The sixth means further comprises gate means arranged between the registers for enabling and disenabling a coupling between the register. A another register, and gate control means provides a control signal to the gate means depending upon the number of bits which are to be added.

BRIEF DESCRIPTION OF THE DRAWINGS

The present invention will be better understood from the following detailed description taken in conjunction with the accompanying drawings in which.

DETAILED DESCRIPTION OF THE PREFERRED EMBODIMENTS

An encoding apparatus for video signals, according to the present invention, will be described in detail below with reference to the accompanying drawings.

Figure 1:
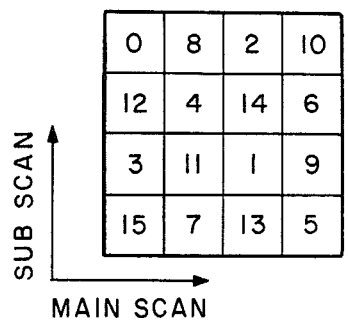
FIG. 1 is a diagram for describing a four-by-four dither matrix used in the invention.

To facilitate a comparative understanding of the present invention as compared to the prior art of halftone representation, known as an ordered dither method, will be explained with reference to FIG. 1. This figure, showing a four-by-four dither matrix, indicates thresholds for digitizing analog video signals having halftones. Thus the numerals of the first row, 0, 8, 2 and 10, are thresholds of a first scanning line of the main scan for video signals: "0" being assigned to the first, "8" to the second, "2" to the third, and "10" to the fourth pixel of the first scanning line. For the fifth and subsequent pixels, the sequence of numerals "0", "8", "2" and "10" is repeated. In this instance the repetition period K of thresholds is "4".

For a second scanning line of the main scan, the thresholds are 12, 4, 14 and 6, which, again, are repeated in the period K of 4. The thresholds for a third scanning line of the main scan are 3, 11, 1 and 9, and the thresholds for a fourth scanning line are 15, 7, 13, and 5. The thresholds for a fifth scanning line of the main scan are the same as the thresholds for the first scanning line. In the direction of the subscan as well, the thresholds repeat themselves in a period 4.

Figure 2:
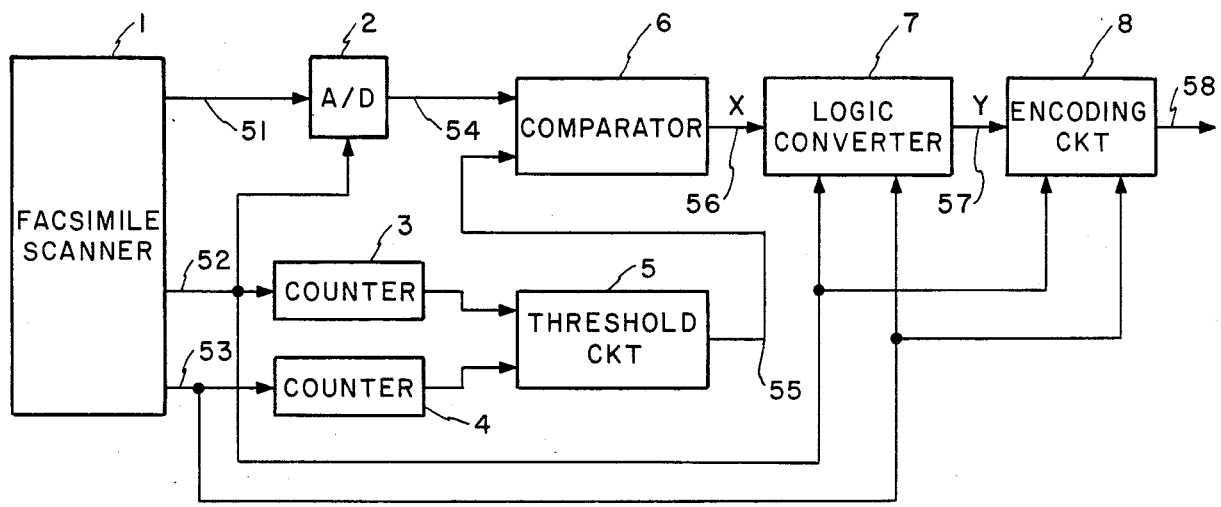
FIG. 2 is a block diagram illustrating an encoder of the prior art.

FIG. 2 is a block diagram illustrating a video signal encoding apparatus, as disclosed in the U.S. Pat. No. 4,475,127. In this and the following illustrations, reference numerals are applied to arrows connecting one block to another block and represent either a signal line or a signal on the line, as long as some confusion is not involved.

In this FIG. 2, reference numeral 1 identifies a fascimile scanner, which produces an analog video signal 51 which is gradually variable between the high and the low levels. Sampling pulses 52 are generated for every pixel of the video signal. A phase signal 53 indicates the start of a main scan. The analog video signal 51 is converted by an analog-to-digital (A/D) converter 2 into a digital signal, which is outputted to a line 54. Meanwhile, a counter 3 receives and counts the sampling pulses 52. A counter 4 receives and counts the phase signals 53.

When the aforementioned four-by-four dither matrix is used, a two-bit counter is used as the counter 3, which indicates a position in the dither matrix in the direction of the main scan. The counter 4 comprises another two-bit counter, which indicates a position in the dither matrix in the direction of the subscan. The outputs of the counters 3 and 4 are supplied as address signals to a threshold generator circuit 5 in which the thresholds shown in FIG. 1 are stored. The threshold generator circuit 5 outputs a periodically varying threshold as a datum to a line 55. The digital signal outputted to the line 54 is compared by a comparator 6 with the threshold fed from the line 55. The comparison signal is digitized according to its level relative to the threshold.

A signal sequence X taken out on an output line 56 of the comparator 6 is logically converted by a logic converter circuit 7, which supplies a converted signal sequency Y to a line 57. The signal sequence Y is compression-encoded by a compression encoding circuit 8, and sent out to a line 58. The compression encoding circuit 8 is here used as a circuit for performing a known encoding technique, such as the modified Huffman encoding technique or the modified READ encoding technique.

The logic converter circuit 7 converts the signal sequence X into digitized logic levels of "1" and "0" by a threshold varying in a period T (T is a positive integer). The signal K is converted into the signal sequence Y which represents whether the sum of T signals, consisting of the signal sequence X and the results of delaying it by 1, 2, ..., (T−1) periods, is an odd number or an even numbers.

Figure 3:
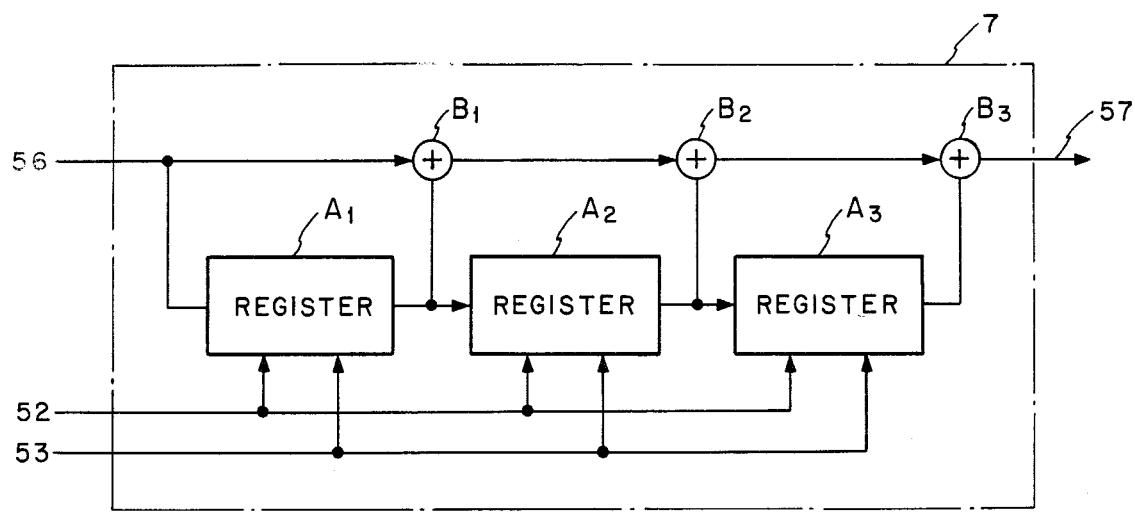
FIG. 3 is a prior art block diagram illustrating a logic converter for use in the encoder of FIG. 2.

Referring now to FIG. 3, the logic converter circuit 7 includes registers $A_1$, $A_2$ and $A_3$, and exclusive OR circuits (EX-OR circuits) $B_1$, $B_2$ and $B_3$. The output of any of these EX-OR circuits, as is well known, is "0" when the inputs are "0" and "0" or "1" and "1", and is "1" when the inputs are "1" and "0" or "0" and "1". In other words, these circuits function as adders, each giving an output of "0" when the sum of the two inputs is an even number (including "0") or a single "1" when it is an odd number.

The digitized signal sequence X is supplied to the register $A_1$ and the EX-OR circuit $B_1$ via the line 56. In the register $A_1$, the signal sequence X is delayed by one sample in response to a sampling pulse 52 whch is supplied from the facsimile scanner 1 (FIG. 2). The output is fed to the other respective inputs of the next register $A_2$ and the EX-OR circuit $B_1$. The registers $A_2$ and $A_3$ function similarly. Therefore, at the respective outputs of the registers $A_1$, $A_2$ and $A_3$ are provided signals resulting from the delaying of the signal sequence X by "1", "2" and "3" sampling periods respectively. Each register is cleared by phase signal 53 supplied from the fascimile scanner 1.

The number of register stages shown here is (T−1), T being the varying period of the threshold. The circuit illustrated in FIG. 3, where the period T is "4", has three register stages. Therefore, such a logic converter circuit, if it is to convert video signals digitized according to a four-by-four dither matrix, will require three each of EX-OR circuits and registers; or, if used for video signals which are digitized according to a six-by-six dither matrix, the need is for five each of EX-OR circuits and registers.

However, if the dither matrix size is altered, the logic converter circuit will have to be redesigned into a completely different logic converter circuit.

Figure 4:
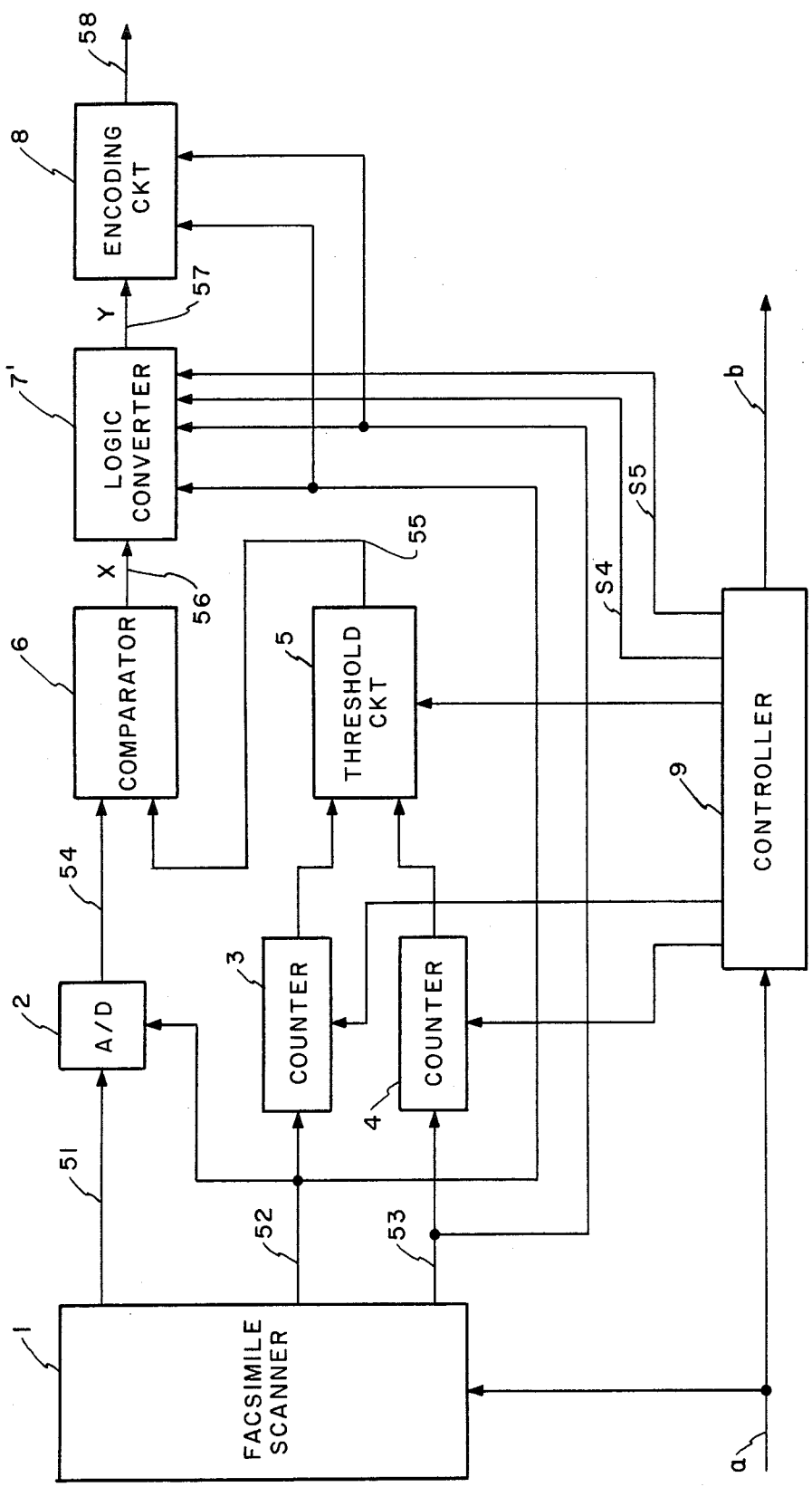
FIG. 4 is a block diagram of an encoder according to a preferred embodiment of the invention.

FIG. 4 is a block diagram illustrating a preferred embodiment of the present invention. This embodiment has functions to select a dither matrix and control a logic converter circuit according to the scanning density, in addition to the functions which are performed by the encoding apparatus illustrated in FIG. 2. In FIG. 4, like reference numerals and characters represent like blocks, signal lines and signals as shown in FIG. 2

In FIG. 4, a facsimile scanner 1 switches the scanning density between 8 and 16 dots/mm in the directions of the main scan and the subscan in response to a scanning density designating signal a which is given by the operator. The scanning density designating signal a is also supplied to a controller 9 which controls counters 3 and 4, a threshold generator circuit 5 and a logic converter circuit 7'. Thus the controller 9 switches the preset values of the counters 3 and 4 according to the scanning density designating signal a representing the scanning density controller 9 controls both the selection of a dither matrix which is stored in the threshold generator circuit 5 and the structural alteration of the logic converter circuit 7'.

When the scanning density is 8 dots/mm, the counters 3 and 4 repeat counting from 1 to 4, and supply the threshold generator circuit 5 with their count outputs, as address signals. When the scanning density is 16 dots/mm, the counters 3 and 4 repeat their counting from 1 to 6. The threshold generator circuit 5 stores the thresholds of a four-by-four dither matrix and of a six-by-six dither matrix. The four-by-four matrix is selected when the scanning density is 8 dots/mm or, the six-by-six matrix is selected when it is 16 dots/mm. The selection is made according to the output signal of the controller 9. At this time, the controller 9 incorporates dither matrix information b into the facsimile control signal, prescribed by CCITT.T.30, to be outputted to a line 58. Information b informs the receiver as to the identity of the dither matrix size.

Video signals 51 are digitized at an A/D converter 2 and then are compared by a comparator 6 with threshold data received from the threshold generator circuit 5. The comparator 6 produces a signal sequence consisting of codes "0" and "1".

The logic converter circuit 7' performs logic conversion in accordance with the threshold varying period of the four-by-four dither matrix, in response to a selection signal S4 supplied from the controller 9 when the scanning density is 8 bits/mm. Or the logic conversion is in accordance with the threshold period of the six-by-six dither matrix, in response to a selection signal S5 when the scanning density if 16 dots/mm.

This preferred embodiment uses the thresholds of a four-by-four dither matrix when the scanning density is 8 dots/mm and the thresholds of a six-by-six dither matrix when it is 16 dots/mm. However, the thresholds of an eight-by-eight dither matrix may also be used at a scanning density of 16 dots/mm.

Figure 5:
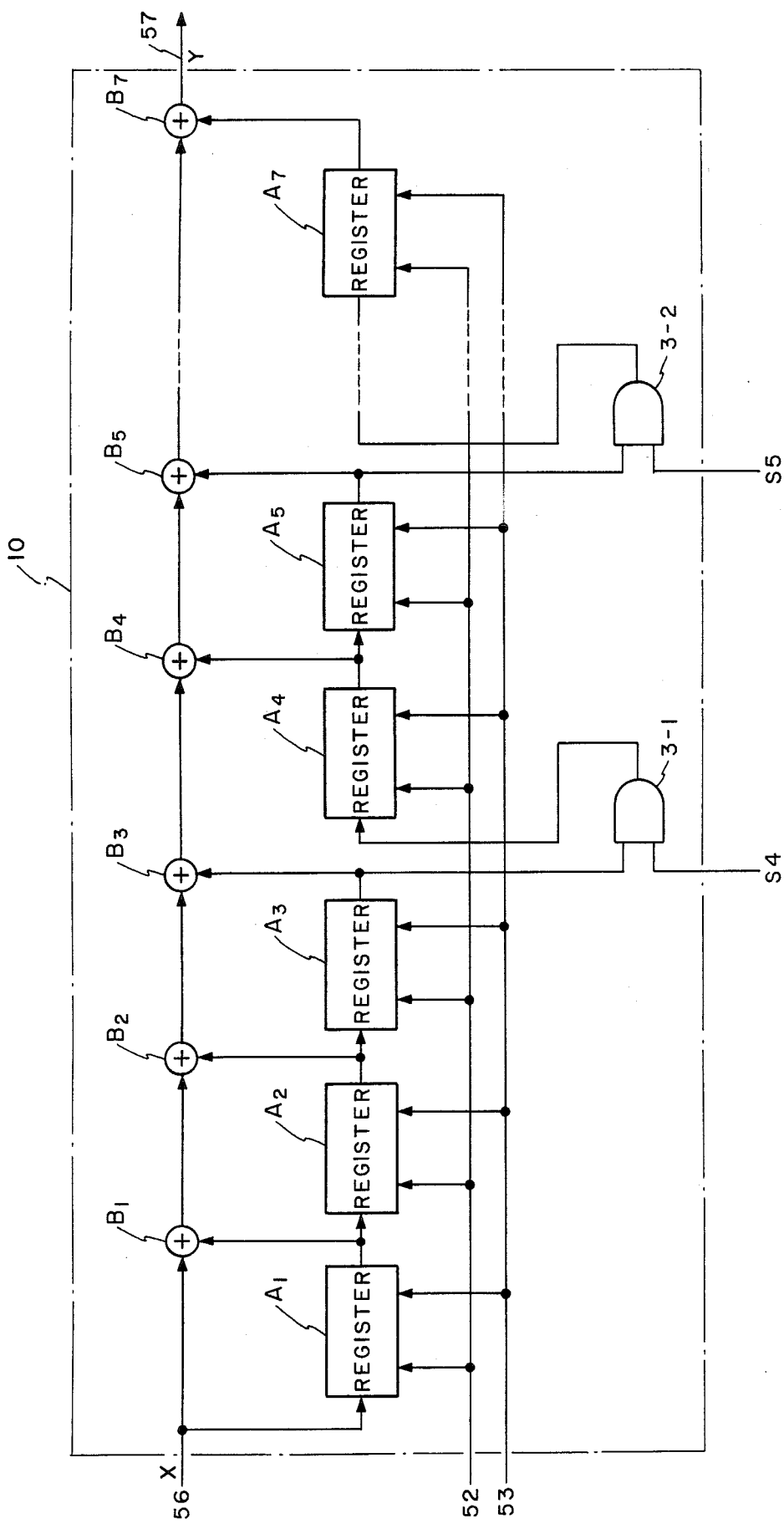
FIG. 5 is a block diagram illustrating a logic converter for use in the encoder of FIG. 4.

FIG. 5 illustrates the logic converter circuit 7'.

Referring to FIG. 5, a signal sequence X is supplied from a line 56 and is fed to both an EX-OR circuit $B_1$ and a register $A_1$. The output of the register $A_1$ is fed to the EX-OR circuit $B_1$ and a register $A_2$. The output of the EX-OR circuit $B_1$ is supplied to the EX-OR circuit $B_2$. The output of register $A_2$ is also supplied to the EX-OR circuit $B_2$ and to the register $A_3$. The output of the EX-OR circuit $B_2$ is supplied to the EX-OR circuit $B_3$. The output of the register $A_3$ is supplied to the EX-OR circuit $B_3$ and to an AND circuit 3-1.

The AND circuit 3-1 takes the logical product of the selection signal S4, indicating the selection of the four-by-four dither matrix, and the output of the register $A_3$, and supplies that product to a register $A_4$.

Finally, an EX-OR circuit $B_7$, having as its inputs the outputs of an EX-OR circuit $B_6$ and a register $A_7$, supplies its output as a signal sequence Y to a compression encoding circuit 8 (FIG. 4). An AND circuit 3-2 (FIG. 5) responds to the selection signal S5, indicating the selection of the six-by-six dither matrix, and the output of a register. The AND circuit 3-2 supplies the resulting logical product to a register $A_6$ (not shown). Therefore, the logic converter circuit 7' alters the state indicated by the selection signal S4 or S5 and converts video signals digitized according to either a four-by-four dither matrix, a six-by-six dither matrix, or an eight-by-eight dither matrix. The converted video signals are new, long-run-length digitized signals of black and white.

Thus, when S4 is 0, the outputs of the registers $A_4$, $A_5$ and thereafter are 0, and will not affect the operations by the EX-OR circuits $B_4$, $B_5$ and thereafter. Accordingly, three each of the EX-OR circuits $B_1$, $B_2$ and $B_3$, and the registers $A_1$, $A_2$ and $A_3$, convert video signals which are digitized according to the four-by-four dither matrix into the new, long run-length digitized signals of black and white. When signal S4 is 1 and S5 is 0, five of the EX-OR circuits $B_1$ to $B_5$, and five of the registers $A_1$ to $A_5$ operate for the six-by-six dither matrix. When signal S4 is 1 and S5 is 1, seven of the EX-OR circuits and seven of the registers operates for the eight-by-eight dither matrix.

Figure 6:
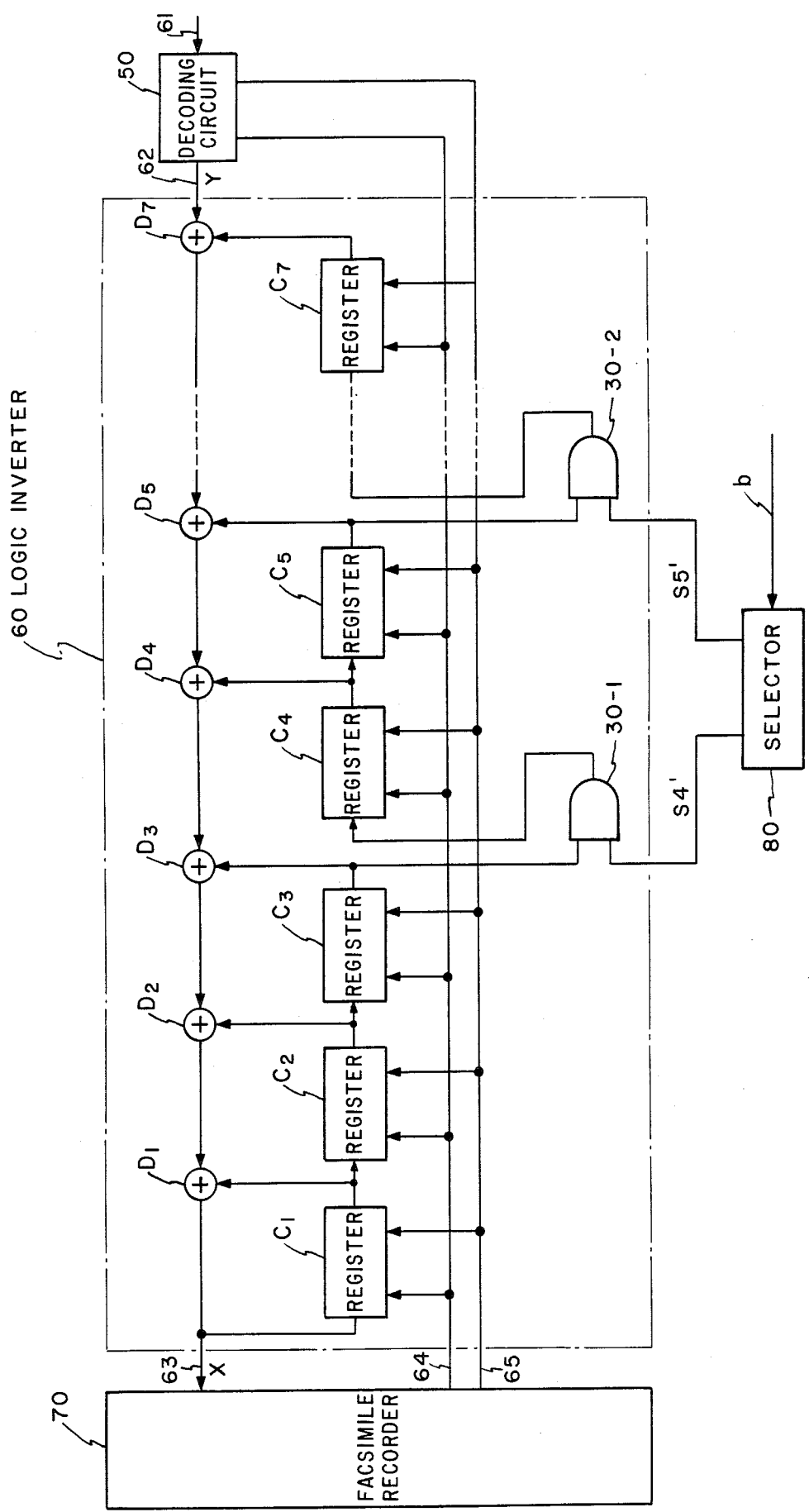
FIG. 6 is a block diagram illustrating a decoder in another preferred embodiment of the invention.

FIG. 6 is a block diagram illustrating an exemplary structure of a video signal decoding apparatus to be used on the receiving side of a transmission system, in combination with the encoding apparatus shown in FIG. 4. A decoding circuit 50 expansion-decodes compressed the codes which were supplied by way of a line 61. Thus, signals which are run-length encoded by the encoding apparatus shown in FIG. 4 are run-length decoded by the decoding circuit 50 into transformed signals Y, which are supplied to a line 62. The decoding circuit 50 can use a known decoding technique, such as a modified Huffman decoding technique or a modified READ decoding technique.

The transformed signals on the line 62 are converted into result signals 62, which are equal to the original signal sequence (the signals on the signal line 56 of FIG. 4) by a logic inverter 60, which includes EX-OR circuits $D_1$ to $D_7$, registers $C_1$ to $C_7$ and AND circuits 30-1 and 30-2. A succession of result signals are supplied to a facsimile recorder 70, where they are reproduced as a video image having halftones.

The facsimile recorder 70 supplies a sampling pulse 64 and a phase signal 65, which are indicative of the beginning of each scanning line. These pulses and signals are sent the registers $C_1$ to $C_7$ and to the decoding circuit 50. The logic inverter 60 is structured substantially identical to the logic converter circuit 7' shown in FIG. 5. The EX-OR circuits $D_1$ to $D_7$ output either "1" or "0" depending on whether the sum of input signals is an odd number or an even number. The registers $C_1$ to $C_7$ successively store the result signals 63 as they are supplied, and are cleared by a phase signal 65. To one input of each of the AND circuits 30-1 and 30-2 is supplied a selection signal S4' or S5' from a selector 80. The selector 80, generating the selection signal S4' or S5' according to the dither matrix identification information b which was sent from the transmitting side. Selector 80 selects S4'=S5'="0" if the dither matrix information b indicates that the dither matrix on the transmitting side is four by four, or S4'="1" and S5'="0" if it is six by six. In the case of a four-by-four selection, only the registers $C_1$ to $C_3$ and the EX-OR circuits $D_1$ to $D_3$ function as constituents of the logic inverter 60. When a six-by-six selection is made, the registers $C_1$ to $C_5$ and the EX-OR circuits $D_1$ to $D_5$ function constituents of inverter 60.

As hitherto described, the present invention has the benefit of achieving extensive applicability to individual bit sequences digitized according to a plurality of dither patterns by using a processing circuit that permits the number of delayed samples of video signals to be variably designated.

What is claimed is:

1. An encoder for encoding a video signal which is gradually variable between high and low half tone density levels into a data-compression digitized signal, said encoder comprising:

first means for generating a plurality of threshold signals which in a preselected period successively take the values of a first predetermined number of halftone threshold levels, said halftone threshold levels being predetermined between said high and said low levels;

second means for comparing said video signal with said threshold signal to produce a first sequence of bits, each of said threshold signals being identified by a predetermined one of binary numbers "0" and "1", which identify said video signals as having a level which is higher and lower than each of said threshold levels, respectively;

third means for producing a second sequence of bits which are representative of codes "1" and "0" depending upon whether the sum of a current bit of said first sequence and i (i being a positive integer) bits taken from previous i sampling periods is an odd or even, said third means comprising i sets, each of said sets comprising a register for delaying one bit and an EX-OR gate for adding a bit and a bit delayed by one sampling period, said sets of registers and EX-OR gates being cascade-connected to each other so that the output of an EX-OR gate in one set is coupled to an input of another EX-OR gate in the next set and the output of a register in one set is coupled to the input of another register in the next set, said third means further comprising gate means arranged between said registers for enabling and disenabling a coupling between said register and said other register, and gate control means for providing a control signal to said gate means depending upon the numbers of bits which are to be added; and fourth means for further converting said second sequence of bits into data-compression digitized signals.

2. A decoder, to be used in combination with the encoder claimed in claim 1, for decoding said digitized signals to a third sequence of bits which are representative of a reproduction of said first sequence of bits, said decoder comprising:

fifth means for decoding and data expansing said digitized signals into a fourth sequence of bits representative of a reproduction of said second sequence of bits; and sixth means for producing said third sequence of bits which are representative of codes "1" and "0" depending upon whether the sum of a current bit of said forth sequence and i (i being a positive integer) bits taken from previous i sampling periods is odd or even, said sixth means comprising i sets, each set comprising a register for delaying one bit and an EX-OR gate having one input which is coupled to the output of said register, said sets being cascade-connected to each other so that the output of said EX-OR gate in one set is coupled to an input of another EX-OR gate in the next set and the input of said register in one set is coupled to the output of another register is the next set, said sixth means further comprising gate means arranged between said registers for enabling and disenabling a coupling between said register and said other register, and gate control means for providing a control signal to said gate means depending upon the number of bits which are to be added.

3. An encoder for half-tone image signals, said encoder comprising a plurality of n-by-n dither matrices for storing different numbers of threshold levels which are representative of different levels of half tones in said images, controller means responsive to a selected scanning density signal for forwarding a dither matrix identification signal, a logic converter means containing a cascaded plurality of sets of logic circuits, and means responsive to said dither matrix identification signal for selectively enabling a selected number of said logic circuit sets for use by said encoder according to n in the dither matrix which is selected by said selected scanning density signal.

4. The encoder of claim 3 wherein each of said sets comprises a register and an associated two input EX-OR gate, one input of each EX-OR gate being coupled to an output of an EX-OR gate in an upstream one of said cascaded sets, the other input of said each EX-OR gate being coupled to the output of the associated register which cooperates with said each EX-OR gate to form a set, the output of each register also being coupled to an input of the register in the next downstream one of said cascaded sets, and at least one steering gate for selectively enabling a plurality of said sets corresponding to n in the selected n-by-n matrix.

5. The encoder of claim 4 and means for applying an image signal to an input of a register and to said one input of the EX-OR forming a first set in said cascade.

6. The encoder of claim 4 and means for taking a converted signal from an output of the EX-OR gate in the last of said sets in said cascade.

7. The encoder of claim 4 wherein the number of said sets is equal to n−1 of the largest dither matrix used by said encoder.

8. The encoder of claim 4 wherein said steering gate enables n−1 sets for the selected n-by-n-matrix.

9. An decoder for half-tone image signals, said decoder comprising a plurality of n-by-n dither matrices for storing different numbers of threshold levels which are representative of different levels of half tones in said images, a logic converter means containing a cascaded plurality of sets of logic circuits, selector means responsive to a received dither matrix identification signal for selectively enabling a selected number of said logic circuit sets for use by said encoder according to n in the dither matrix which is selected by said dither matrix identification signal.

10. The decoder of claim 9 wherein each of said sets of logic circuits comprises a register and an associated two input EX-OR gate, one input of each EX-OR gate being coupled to an output of an EX-OR gate in an upstream one of said cascaded sets, the other input of said each EX-OR gate being coupled to the output of the associated register which cooperates with said each EX-OR gate to form a set, the output of each register also being coupled to an input of the register in the next downstream one of said cascaded sets, and at least one steering gate for selectively enabling a plurality of said sets corresponding to n in the selected n-by-n matrix.

11. The decoder of claim 10 and facsimile means responsive to the last downstream one of said registers for generating an image with half tones.

* * * * *